C. Sayward.
Gudgeon for Booms.
No. 79,864.  Patented Jul. 14, 1868.

Witnesses
John C. Stacy
B. H. Smith

Inventor
Charles Sayward

United States Patent Office.

CHARLES SAYWARD, OF GLOUCESTER, MASSACHUSETTS.

Letters Patent No. 79,864, dated July 14, 1868.

IMPROVEMENT IN GUDGEONS FOR BOOMS.

*The Schedule referred to in these Letters Patent and making part of the same.*

TO ALL WHOM IT MAY CONCERN:

Be it known that I, CHARLES SAYWARD, of Gloucester, in the county of Essex, and State of Massachusetts, have invented certain new and useful Improvements in "Gudgeons for Booms;" and I do hereby declare that the following is a full, clear, and exact description of the same, reference being had to the accompanying drawings, making a part of this specification.

The object of my invention is to obviate the objections experienced in gudgeons for booms as at present patented, and to provide a method of attaching the boom to the mast, so that it can readily move in any direction about its attachment.

In the patent of Mr. Robbins, dated July 9, 1867, he has shown an arrangement by which the boom is hinged to a block, through which a pivot passes, said pivot being attached to a gudgeon, through which the pintle passes which connects the whole with the mast.

Figure 2:
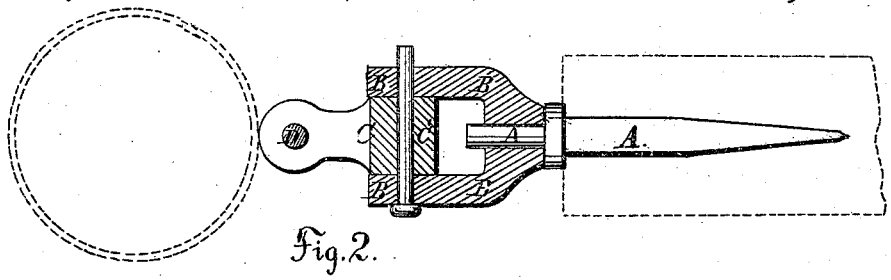
Figure 2 is a horizontal section.
Figure 3:
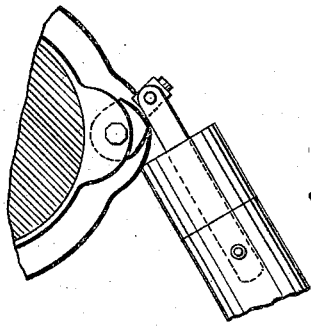
Figure 3 shows a patented article and its objectionable feature.
Figure 1:
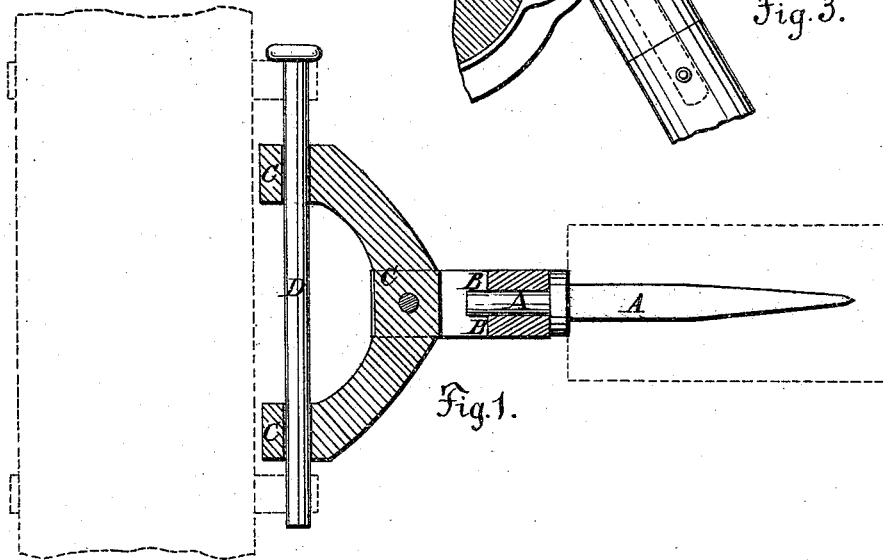
Figure 1 is a vertical section.

It is found by actual observation, that when a vessel is put before the wind the boom turns upon the pivot to such an extent that the whole attachment is deranged and doubled up, as shown in fig. 3, thus entirely destroying its utility.

In my invention, I place the part bearing the pivot A in direct connection with the boom, and pass the pivot through the part B, which is hinged to the yoke C, which yoke turns upon the pintle D.

By this arrangement, I make it impossible for the several parts to perform other than their intended functions, viz, that the boom will have a swivel motion and a motion up, down, or sideways, as may be required, and that it may have a farther upward and downward motion upon the pintle.

I am aware that the combination shown in my description is old, and therefore do not claim it, but wish to confine myself to the arrangement of the parts combined, viz, having the swivel, and not the hinge, next the boom.

Having thus described my invention, what I claim as new, and desire to secure by Letters Patent, is—

The arrangement of the swivel, hinge, yoke, and bolt, the swivel intervening between the boom and the hinge, substantially as and for the purpose specified.

CHARLES SAYWARD.

Witnesses:
B. H. SMITH,
JOHN C. STACY.